United States Patent
Daum et al.

(10) Patent No.: US 7,590,485 B2
(45) Date of Patent: Sep. 15, 2009

(54) SYSTEM AND METHOD FOR IMPROVED TRAIN HANDLING AND FUEL CONSUMPTION

(75) Inventors: Wolfgang Daum, Erie, PA (US); Glenn R. Shaffer, Erie, PA (US); Daniel Ballesty, Wattsburg, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/426,414

(22) Filed: Apr. 20, 2009

(65) Prior Publication Data

US 2009/0204317 A1 Aug. 13, 2009

Related U.S. Application Data

(62) Division of application No. 11/148,815, filed on Jun. 8, 2005, now Pat. No. 7,522,990.

(51) Int. Cl.
*B61C 17/12* (2006.01)

(52) U.S. Cl. ............................. 701/123; 701/19; 701/20

(58) Field of Classification Search ............. 701/19–20, 701/123
See application file for complete search history.

(56) References Cited

U.S. PATENT DOCUMENTS

| 4,042,810 A | | 8/1977 | Mosher et al. | |
| 4,344,364 A | * | 8/1982 | Nickles et al. | 105/62.1 |
| 4,602,335 A | * | 7/1986 | Perlmutter | 701/20 |
| 4,648,040 A | * | 3/1987 | Cornell et al. | 701/52 |
| 4,663,713 A | * | 5/1987 | Cornell et al. | 701/52 |
| 4,663,714 A | * | 5/1987 | Cornell et al. | 701/52 |
| 5,239,472 A | | 8/1993 | Long et al. | |
| 5,950,967 A | | 9/1999 | Montgomery et al. | |
| 6,144,901 A | | 11/2000 | Nickles et al. | |
| 6,332,106 B1 | * | 12/2001 | Hawthorne et al. | 701/19 |
| 6,434,452 B1 | | 8/2002 | Gray | |
| 7,047,938 B2 | * | 5/2006 | Flynn et al. | 123/352 |
| 7,302,895 B2 | * | 12/2007 | Kumar et al. | 105/26.05 |
| 2003/0105561 A1 | | 6/2003 | Nickles et al. | |
| 2004/0122569 A1 | | 6/2004 | Bidaud | |
| 2004/0128047 A1 | * | 7/2004 | Graves et al. | 701/54 |
| 2004/0133315 A1 | * | 7/2004 | Kumar et al. | 700/302 |
| 2006/0282199 A1 | * | 12/2006 | Daum et al. | 701/19 |

* cited by examiner

*Primary Examiner*—Thomas G Black
*Assistant Examiner*—Shelley Chen
(74) *Attorney, Agent, or Firm*—Robert Wawrzyn, Esq.; Terry M. Sanks, Esq.; Beusse Wolter Sanks Mora & Maire, P.A.

(57) ABSTRACT

A system for improving fuel efficiency of a railroad train located on a railroad train having a locomotive consist including one or more railroad locomotives, said system including a position-determining device, a track profile database including terrain and contour data about a railroad track, and a processor including an algorithm to calculate a load of said train and a feed forward algorithm to determine an acceleration rate and/or a deceleration rate of said train based on said calculated load and forth coming terrain and contour of a railroad track, wherein said change in condition of the track is determined on-board the locomotive consist and the locomotive consist power setting is adjusted to optimize locomotive consist fuel consumption based on the calculated load of the train as the train is proximate to the change in track condition.

13 Claims, 5 Drawing Sheets

FIG. 3
Dash 9 Typical Performace

| Notch | HP | Lbs/Hr | Gals/HR | SFC |
|---|---|---|---|---|
| 0 | 0 | 27.1 | 3.85- | |
| 1 | 200 | 81.5 | 11.75 | 0.4075 |
| 2 | 500 | 189.4 | 26.9 | 0.3788 |
| 3 | 1040 | 385.9 | 54.81 | 0.3711 |
| 4 | 1550 | 554.3 | 78.73 | 0.3576 |
| 5 | 2220 | 771.9 | 109.64 | 0.3477 |
| 6 | 2940 | 986.1 | 140.7 | 0.3354 |
| 7 | 3660 | 1196.1 | 169.9 | 0.3268 |
| 8 | 4500 | 1473.8 | 209.35 | 0.3275 |

SYSTEM AND METHOD FOR IMPROVED TRAIN HANDLING AND FUEL CONSUMPTION

CROSS-REFERENCE TO RELATED APPLICATIONS

This application claims priority to and is a Divisional of U.S. application Ser. No. 11/148,815 filed Jun. 8, 2005 now U.S. Pat. No. 7,522,990, and incorporated herein by reference in its entirety.

BACKGROUND OF THE INVENTION

This invention relates to locomotive operations, and more specifically to a system and method for autonomously improving train handling and fuel consumption when encountering track terrain changes.

Depending on a train operator's level of experience, dedication, and even how one is feeling on a given day, handling of a railroad train differs between operators which, in turn, results in differences in train mission fuel burn rate as well as in train force differences. For example, a skilled operator who is dedicated and keenly attentive will be more familiar with a railroad track and, thus, anticipate grade and curve changes before the train encounter these track changes and slow down (decelerate) or speed up (accelerate) the train in anticipation of the changes. This results in a smoother operation of the train as well as in burning less mission fuel as compared to an operator who is not as familiar with the track.

Though systems currently exist to assist train operators in minimizing burning mission fuel, such systems typically require recording handling performance data for later processing to assist in determining how to best minimize burning mission fuel. Further, it is believed that such systems perform most of the processing remote from the train for use during another run of the locomotive. Such systems generally are not able to process real time data to account for other external factors, such as weather, while the train is in motion.

BRIEF DESCRIPTION OF THE INVENTION

Towards this end, a system, method and software code is needed to allow for on-board evaluation and determination of a train's speed as it is proximate to changes in track conditions where such information is then used to adjust train speed to improve fuel efficiency train handling. In a preferred embodiment, the present invention is directed to a self-learning and auto correcting system. In another preferred embodiment though self-learning, operator interaction may be required to implement the present invention. Thus, the present invention disclose a method, system, and computer software for controlling the operation of a railroad train having a locomotive consist comprising one or more railroad locomotives to improve locomotive consist fuel efficiency. The method comprises calculating, on-board the locomotive consist, a load of said train being moved by the locomotive consist based on measuring the movement of the train in response to locomotive consist power settings. The method further includes determining, on-board the locomotive consist, a current location of the train. Identifying, on-board the locomotive consist, a change in condition of said track prior to said train reaching said change in track condition is also part of the method taught. The method also includes adjusting, on-board the locomotive consist, the locomotive consist power setting to optimize locomotive consist fuel consumption based on said calculated load of said train as said train is proximate to said change in track condition.

The system comprises a position-determining device, a track profile database comprising terrain and contour data about a railroad track, and a processor comprising an algorithm to calculate a load of said train and a feed forward algorithm to determine at least one of an acceleration rate or a deceleration rate of said train based on said calculated load and forth coming terrain and contour of a railroad track. Change in condition of the track is determined on-board the locomotive consist and the locomotive consist power setting is adjusted to optimize locomotive consist fuel consumption based on the calculated load of the train as the train is proximate to the change in track condition.

The computer software code comprises a software module for calculating a load of the train being moved by the locomotive consist based on measuring the movement of the train in response to locomotive consist power settings. A software module for determining a forthcoming condition of a track prior to the train reaching the change in track condition is also provided. The software code also has a software module for calculating at least one of an acceleration rate or a deceleration rate of said train to optimize fuel consumption based on the calculated load and the change in the forthcoming track condition.

The technical effect is to provide software code that is able to process data about the train and use the information to improve fuel efficiency train handling by adjusting the train speed prior to reaching changes in a railroad track.

BRIEF DESCRIPTION OF THE DRAWINGS

The features and advantages of the present invention will become apparent from the following detailed description of the invention when read with the accompanying drawings in which:

FIG. 3 is a chart illustrating exemplary values of fuel verses power for a locomotive.

DETAILED DESCRIPTION OF THE INVENTION

Figure 1:
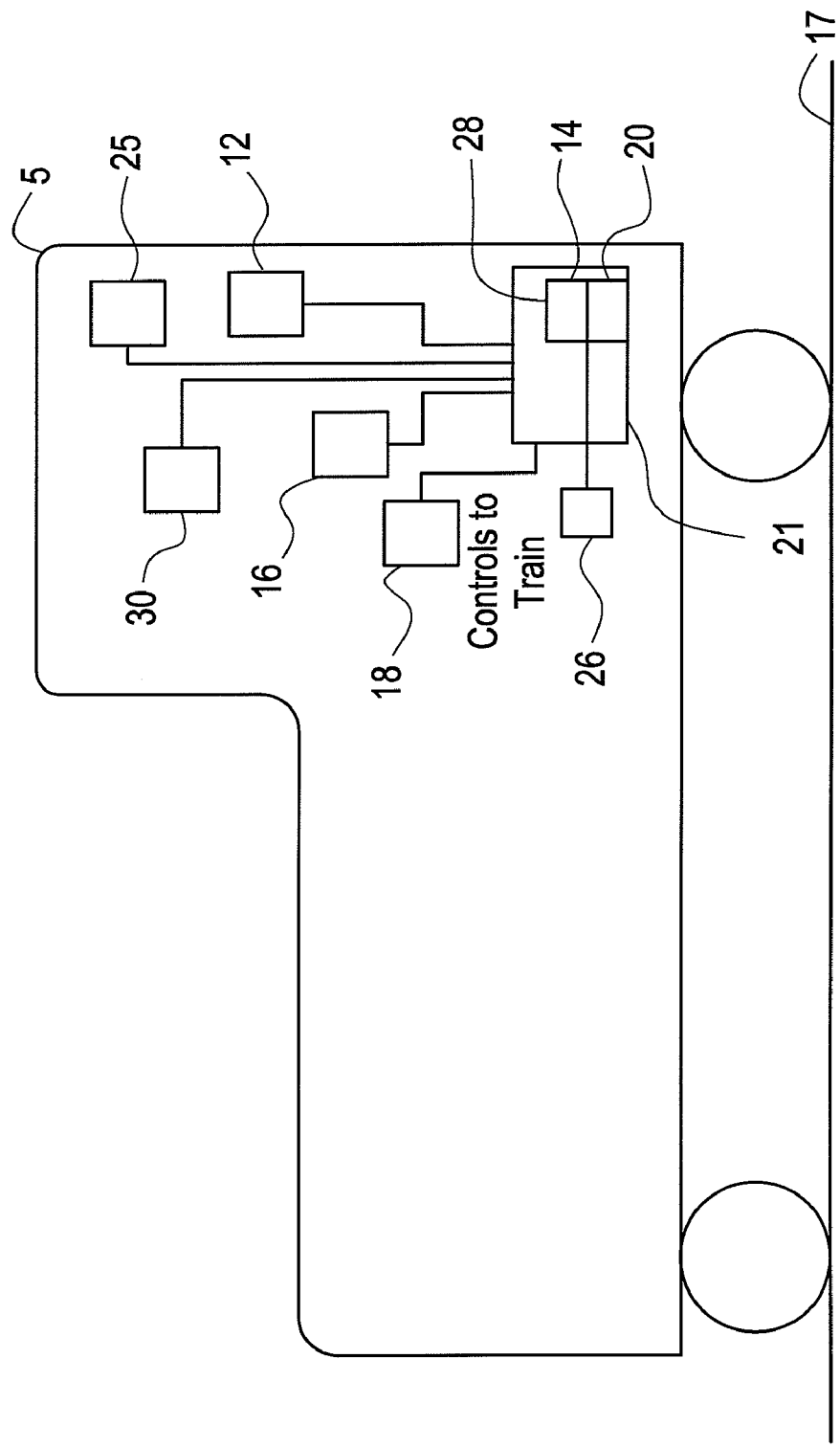
FIG. 1 is a block diagram disclosed in a locomotive of exemplary elements of the present invention.

With reference to the figures, exemplary embodiments of the invention will now be described. Before describing in detail the particular system and method, it should be observed that the present invention resides primarily in a novel combination of components and steps related thereto. Accordingly, the system and method steps have been represented by conventional elements in the drawings, showing only those specific details that are pertinent to the present invention, so as not to obscure the disclosure with structural details that will be readily apparent to those skilled in the art having the benefit of the description herein. Additionally, the phraseology and terminology employed herein are for the purpose of description and should not be regarded as limiting. Towards this end, terms used in the singular shall also be read to encompass the term as if it was stated in its plurality. This reasoning shall also apply in the inverse. For example, the use of the term "invention" shall be construed as also meaning the term "inventions" whereas the use of the term "inventions" shall also be construed to mean the term "invention."

A general reference to a locomotive is used throughout. The present invention is applicable to all types of locomotives including, but not limited to, diesel, electric, and hybrid systems, including but not limited to diesel-electric, diesel hydraulic, hydraulic-electric. Likewise, the use of the term power setting is used generically since various drive systems can be used based on the type of locomotive, such as but not limited to mechanical drives and hydraulic drives. Based on the drive system and type of locomotive, those skilled in the art recognize that speed for a locomotive is established differently from the other types of drives and locomotives.

FIG. 1 is an exemplary illustration of a locomotive 5. In a railroad train one or more locomotives 5 may be part of the train wherein the locomotives are considered a consist. FIG. 1 further illustrates block diagram representations of exemplary elements of the present invention. Though shown as being located on a single locomotive 5, these elements can be located in other parts of a train or other locomotives in the locomotive consist. It is also possible that the elements are not all located in a single car or locomotive 5. In other words, elements may be located in several parts of the train and connected to still perform the function of the present invention.

As further illustrated in FIG. 1, a position-determining device 12 is provided on the train. This device is connected to a processor 14. A track profile database 16 is also provided and is also connected to the processor 14. The track profile database 16 includes such information as terrain and contour data about a railroad track 17. A memory storage device 26 is attached to the processor 14. The memory storage device 26 is provided to store, either temporarily or for longer periods, data provided and/or calculated by the processor 14 for use during current operation of the train or for use during later operation. Train operation collection devices 30 are also provided on the train and are connected to the processor 14. The collection devices 30 are operable to determine, but not limited to notch speed (call), tractive power, brake pipe setting, speed, fuel consumption power settings, and acceleration and deceleration rates of the train. The information collected can be used by the algorithms 20, 21, 28, discussed below to help insure more accurate timing when accelerating or decelerating the train.

The processor has a number of algorithms 20, 21, 28 that are processed with the processor 14. One algorithm 20 is provided to calculate a load of the train. Another algorithm 21 is a feed forward algorithm that determines the acceleration rate or deceleration rate of the train based on the calculated load in view of the forthcoming terrain and contour of the railroad track. An available third algorithm 28 may be one to determine accuracy of a calculated load value. This may be accomplished by calculating a second load value of the train and the first calculated load valve based on the second calculation. Examples of the techniques used in the algorithms discussed above include, but are not limited to, time dependent and time varying Taylor series expansions. Those skilled in the art will also recognize that algorithms utilizing Kalman filters can be used since they support estimations of past, present, and even future states even when the precise nature of the modeled system is unknown.

In one exemplary embodiment a load is assumed and/or is available and then a calculation is made using this third algorithm 28 based on prior data stored in the memory storage device 26, including a time and location when the train traversed over a specific length of railroad track 17. The second calculation is compared to the original load value and the actual load used for further calculations is adjusted accordingly. In another exemplary embodiment, the start time and start location of the train is compared to a given location that the train has already traversed. Taking this information and including information pertaining to a power setting of the locomotive 5 during that time period, a load is calculated. This load value is compared to the original load value already being used by the present invention and the load value used by the present invention is adjusted accordingly.

Figure 2:
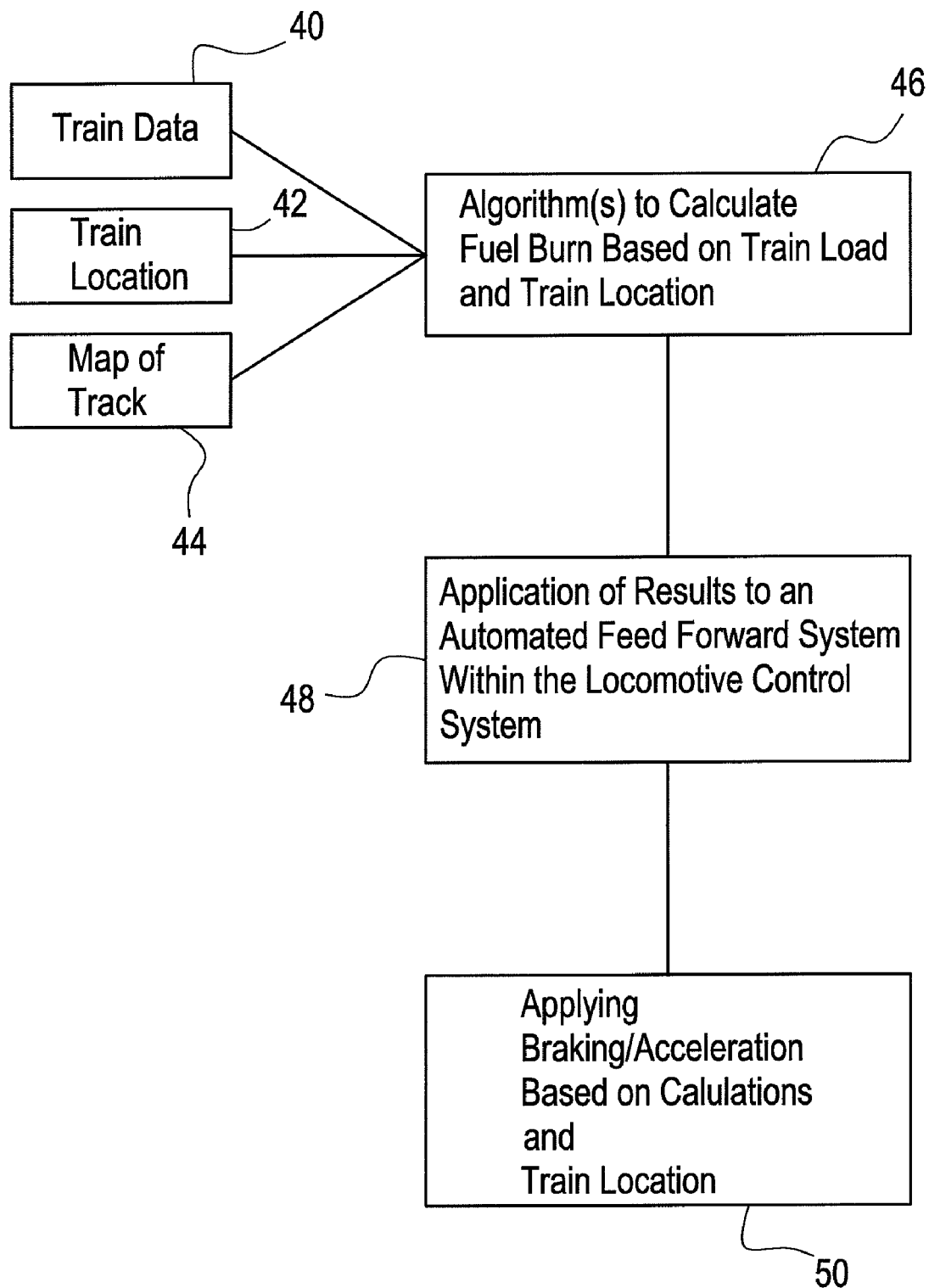
FIG. 2 is a block diagram of a general overview of exemplary steps of the present invention.

FIG. 2 is a block diagram of a general overview of exemplary blocks containing exemplary steps of the present invention. Information from the train (train data) 40, specifically the locomotive consist is collected with the collection devices 30. The location of the train (train location) 42 must be determined. Location can be determined with, but not limited to, an on-board GPS system, a elapse mile counter that is part of the locomotive control system, via track systems, and/or via other locomotives in the consist. A map of the track 44 is provided so that the location of the train is identified. The map may include, but is not limited to, such information as upward grades, downward grades, curves, rural/city/residential locations (if certain speed restrictions may apply).

An algorithm, or several algorithms, is used to calculate fuel burn rate 46. Fuel burn rates are calculated based on a train load and train location. Data collected is correlated with train location. In one exemplary embodiment, a train load is calculated based on notch speed and the time the train traverses a given length of track. In another exemplary embodiment, using notch speed and traction power changes versus grade and friction, an approximation of a train load can be calculated. Train run friction and train curve friction are also determined where train speed and traction power is collected based on a track condition and used to determine a train load. In another embodiment where track parameters are not known, friction and wind forces, total fuel consumed during powered modes, and resulting train speed changes are used in conjunction with Specific Fuel Consumption (SFC) per horsepower for the locomotive to calculate the train load. A table illustrating typical exemplary values of fuel 33 verses horsepower 35 and SFC 37 for a locomotive 5 is provided in FIG. 3. This chart 31 also identifies these values based on a notch speed of the locomotive. The resulting load calculations are used to determine acceleration and deceleration based on pending changes in the railroad track. Preferably, an initial load assessment is calculated during the initial acceleration and used as the initial input for mission optimization.

The resulting calculations are supplied to a Locomotive Control System 48 to control how the train will perform, as it is proximate to certain track terrain. By proximate, the train can be approaching a change in track conditions, encountering the change in track conditions, and/or already encountered the change in track conditions. Specifically, the calculations made are compared against an actual mission performance. Based on the calculations and train location either the velocity of the train remains constant, braking is applied to decelerate the train, or the train is accelerated 50.

To further assist determining the proper acceleration or deceleration rate, a weather-collecting device 25 is also aboard the train. This devices includes weather collecting apparatus to determine present weather conditions that the train is experiencing and even weather conditions on the track that the train will shortly traverse. Such weather conditions include, but are not limited to, wind conditions, rain, and snow.

In another preferred embodiment, the weather conditions are relayed to the train from a dispatcher at a remote location, such as but not limited to a train depot. In yet another preferred embodiment, weather conditions are downloaded, such as over a wireless Internet connection. In another preferred embodiment, a local camera placed on the train can provide visual images of the weather wherein the user can then input data and/or commands specific to the type of weather being witnessed. In another preferred embodiment, any number of the approaches described above is utilized. The weather condition data is provided to the processor wherein the feed forward algorithm uses this data to more accurately calculate acceleration or deceleration rates for the locomotive consist.

Figure 4:
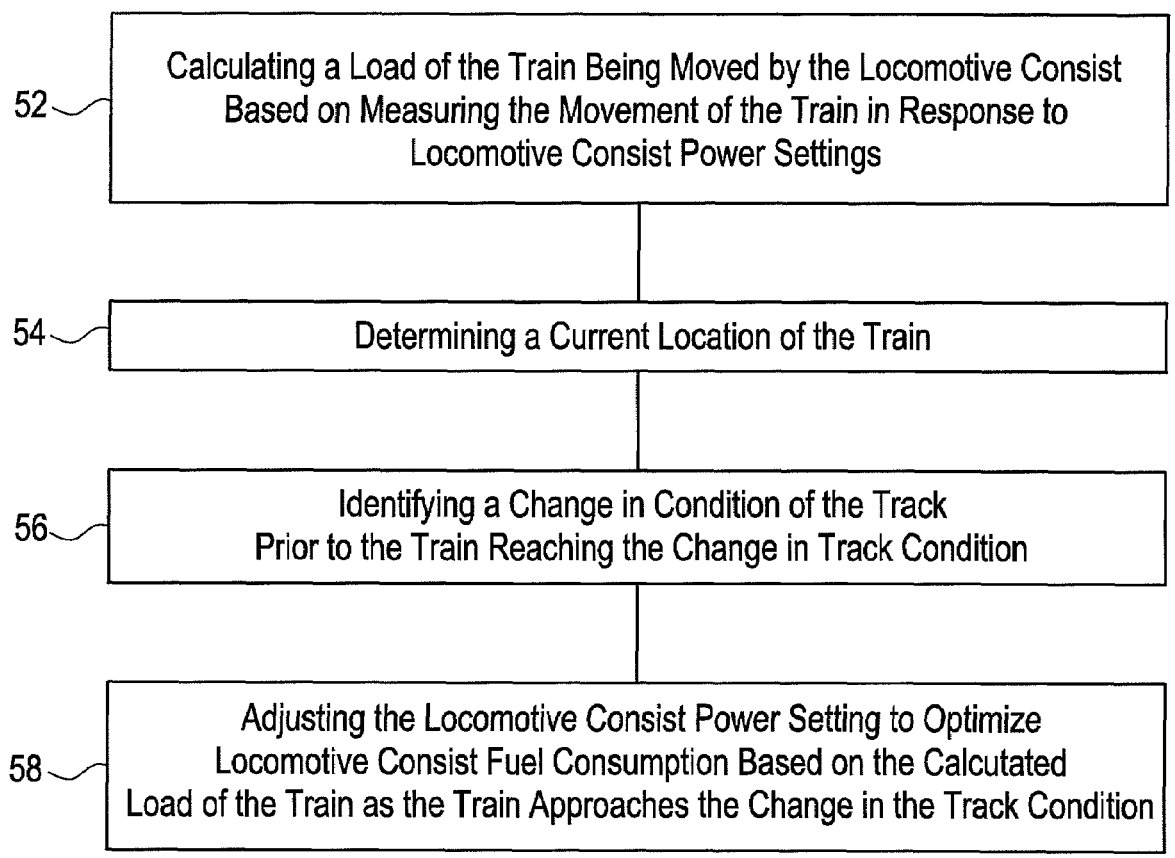
FIG. 4 is a flow chart illustrating exemplary steps of the present invention.

FIG. 4 is a flow chart illustrating exemplary steps of the present invention to improve fuel efficiency. As illustrated, a calculation of a load of the train must be performed, step 52. This may be calculated based on measuring the movement of the train in response to the locomotive consist's power settings. A current location of the train must be determined, step 54. As the train is moving, changes in track conditions must be identified prior to the train reaching the change in track location, step 56. As discussed above, such change in track conditions includes, but is not limited to, upward grades, downward grades, curves, and rural/city/residential locations. The locomotive consist power setting is adjusted to optimize fuel consumption based on the calculated load of the train as the train is proximate to the change in track condition, step 58. In a preferred embodiment, all of these functions are performed aboard the train.

Figure 5:
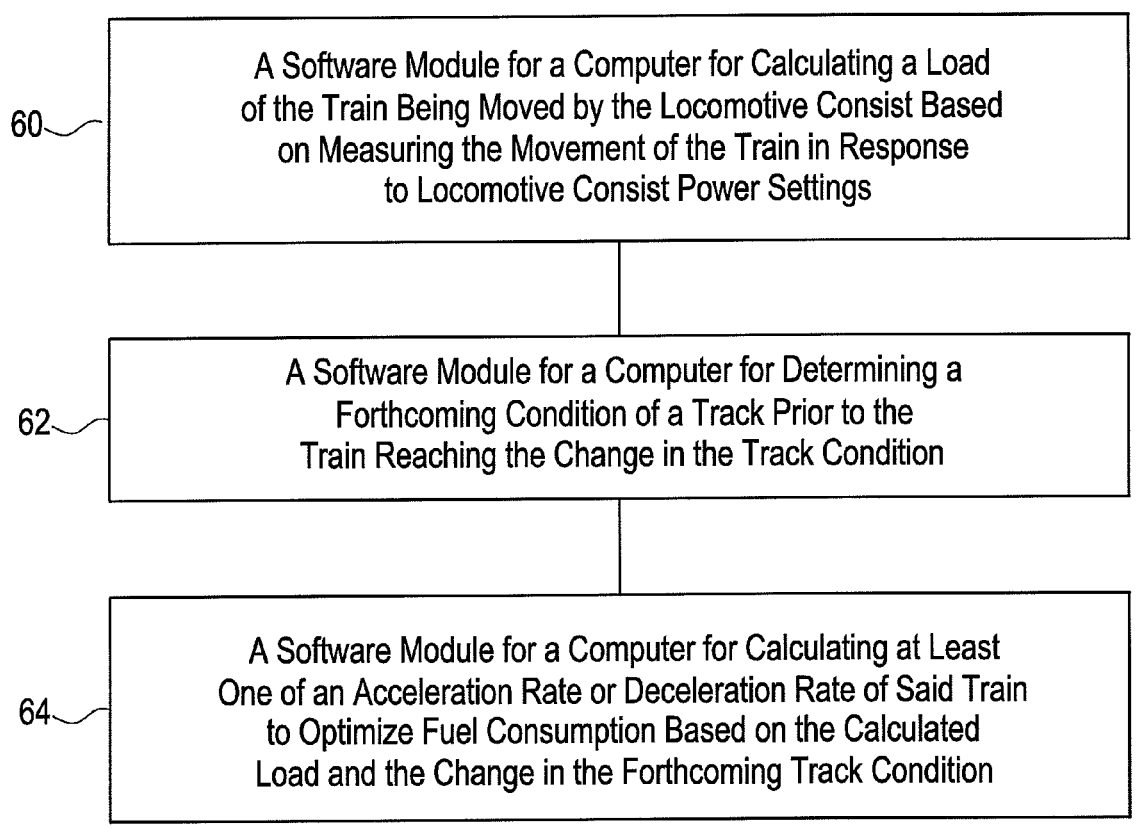
FIG. 5 is a flow chart illustrating exemplary software code elements of the present invention.

FIG. 5 is a flow chart illustrating exemplary software code elements of the present invention for improving fuel efficiency of a railroad train where the train has at least one computer on a locomotive or locomotive consist. Thus, those skilled in the art will recognize that the software codes need not reside in a single computer, but different codes can be part of a plurality of computers that are networked together to provide the same end result as a single computer with all codes provided in the single computer. Further, those skilled in the art will recognize that though three modules are illustrated, these modules can be separated into more modules and/or combined into fewer modules.

One software module 60 is provided for calculating a load of the train based on measuring the movement of the train in response to power settings of the locomotive consist. Another software module 62 determines a forthcoming condition of the track prior to the train reaching the change in track condition. A third software module 64 determines acceleration or deceleration rates for the train in order to optimize fuel consumption based on the calculated load and the change in the forthcoming track condition.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A system for improving fuel efficiency of a railroad train located on a railroad track having a locomotive consist comprising one or more railroad locomotives, said system comprising:

a) a position-determining device;
   b) a track profile database comprising terrain and contour data about the railroad track; and
   c) a processor comprising an algorithm to calculate a load of said train and a feed forward algorithm to determine an acceleration rate and/or a deceleration rate of said train based on said calculated load and forth coming terrain and contour of the railroad track;
   d) wherein a change in condition of the track is determined on-board the locomotive consist and the locomotive consist power setting is adjusted to optimize locomotive consist fuel consumption based on the calculated load of the train as the train is proximate to the change in track condition.

2. The system of claim 1, wherein said algorithm to calculate the load of said train comprises a combination of utilizing a start time and start location of said train, a present location of said train, and a condition of said track and/or a combination of a train velocity at which said train is moving when at a specific power setting.

3. The system of claim 1, further comprises a weather collecting device to determine weather conditions.

4. The system of claim 3, wherein said feed forward algorithm further comprises factoring weather conditions to determine an acceleration rate and/or a deceleration rate.

5. The system of claim 1, further comprises a memory device connected to the processor.

6. The system of claim 4, further comprises a third algorithm for determining an accuracy of a calculated load value by calculating a second load of said train based on prior data stored in said memory device including a time and location when said train has traversed over a length of prior traveled track.

7. The system of claim 6, wherein said third algorithm further comprises determining an accuracy of a calculated load value by calculating a second load of said train and comparing with said first calculated load.

8. The system of claim 1, further comprises train operation collection devices operatively connected to the processor.

9. The system of claim 8, wherein data from said collection devices are used to determine at least one of an acceleration rate or a deceleration rate of said train based on said calculated load and forth coming terrain and contour of a railroad track.

10. The system of claim 1, wherein said position-determining device determines at least one of changes in location of the train, a train velocity, and a train acceleration.

11. The system of claim 1, wherein terrain and contour data about a railroad track further comprises track inclination, track curvature and/or rail friction characteristics.

12. The system of claim 1, wherein an initial train load is assumed for the train and the calculated train load is used to improve the accuracy of the measure of the train load used in adjusting the consist power setting.

13. The system of claim 1, wherein the algorithm and/or the feed forward algorithm comprises a time dependent and time varying Taylor series expansion calculation and/or a Kalman filter.

* * * * *